Dec. 26, 1967  H. H. WAGGERSHAUSER  3,360,639
FLASH ADAPTOR
Filed July 12, 1965

HERMAN H. WAGGERSHAUSER
INVENTOR.
BY
ATTORNEYS

United States Patent Office 3,360,639
Patented Dec. 26, 1967

3,360,639
FLASH ADAPTOR
Herman H. Waggershauser, Rochester, N.Y., assignor to Eastman Kodak Company, Rochester, N.Y., a corporation of New Jersey
Filed July 12, 1965, Ser. No. 471,184
1 Claim. (Cl. 240—1.3)

ABSTRACT OF THE DISCLOSURE

A photoflash unit having a plurality of reflectors and sockets to receive separately inserted flashbulbs, a connecting base attachable to a multilamp-flash-package socket, and means for ejecting simultaneously all flashbulbs from the unit.

---

This invention relates to flash photography, and more particularly, to a photoflash attachment for use with photographic flash devices and cameras having multilamp package sockets.

There has been developed a multilamp photoflash package comprising an attaching base having a plurality of photoflash lamps and individual reflectors mounted thereon. For use with such packages, there have also been developed a number of photographic flash devices and cameras having built-in flash systems to receive such packages for sequential placement of the lamps of the packages in a photoflash circuit to augment scene light in timed relation with camera operation. United States patent applications disclosing some of these features include Ser. No. 417,913, filed Dec. 14, 1964; Ser. No. 417,914, now Patent No. 3,327,105, filed Dec. 14, 1964; and Ser. No. 438,585, now Patent No. 3,335,651, filed Mar. 10, 1965.

As an alternative, however, a photographer may find it desirable to use individual lamps rather than a package of lamps as described above. In this connection, I have developed a reusable flash adaptor which includes a plurality of individual reflectors and sockets to receive individual photoflash lamps of known manufacture. According to my invention, the flash adaptor includes a common connecting base for selective attachment of the adaptor to the package socket of a multilamp flash camera and an ejector means to simultaneously remove all of the inserted lamps from the individual sockets.

An important object of my invention, therefore, resides in the provision of a photoflash adaptor which receives individual flash lamps and is insertable into the connecting socket of a multilamp flash camera.

A further object of my invention resides in the provision of a simple and inexpensive photoflash adaptor receiving a plurality of individual flash lamps and having an ejector means to simultaneously eject all of the inserted lamps after use.

These and other objects and advantages will become more apparent during the course of the following description, the accompanying drawing forming a part thereof and wherein.

Figure 2:
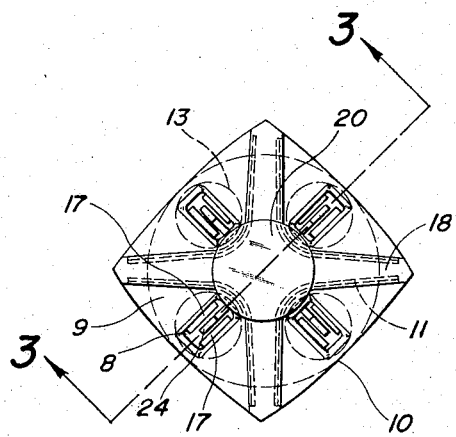
FIG. 2 is a top view of the embodiment shown in FIG. 1.
Figure 1:
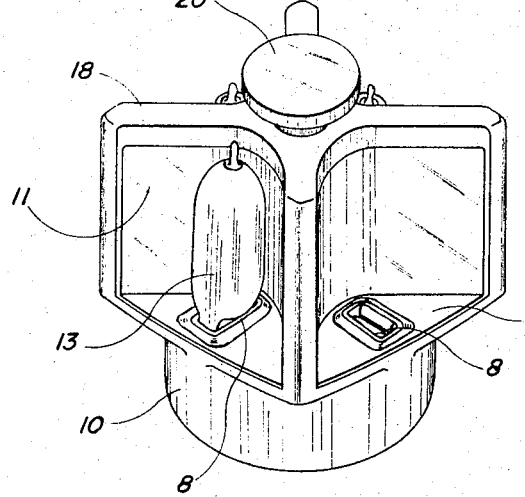
FIG. 1 is a perspective view of a preferred embodiment of a flash attachment according to my invention.

Referring to the drawing, a preferred embodiment of my invention suitably includes a circular body portion 10 having upper cover plate 9 with a plurality of individual lamp receiving sockets 8 defined in the cover plate 9 to receive the base of a flash lamp 13 of known manufacture (AG-1). Positioned behind each socket 8 is a channel-shaped reflector 11, thereby providing a plurality (four) of lamp socket and reflector assemblies mounted in the body portion 10. Below body portion 10 is a connecting base portion 12 for attachment of the flash adaptor to the connecting socket of a multilamp camera such as that disclosed in U.S. application Ser. No. 438,585.

Figure 3:
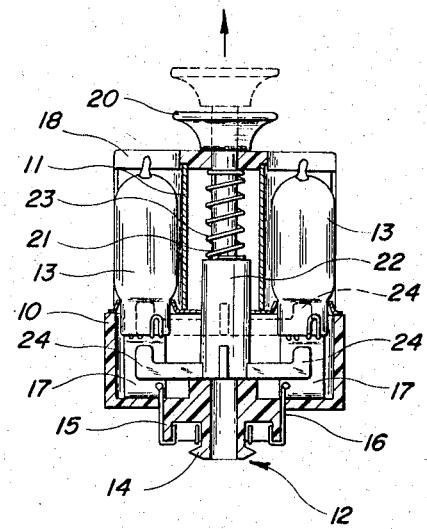
FIG. 3 is a cross-sectional view taken on line 3—3 of FIG. 2.

The connecting base 12 comprises a centrally depending center post 14 and an annular contact ring 15 formed in the shape of the connecting base of a multilamp package as disclosed in U.S. applications Ser. Nos. 417,913 and 417,914. Passing vertically around the contact ring 15 and through the body portion 10 are four pairs of adjacent electrical contact leads 16, each contact lead 16 extending from the contact ring 15 to the interior of the body portion 10 as shown in FIG. 3. The end of each lead 16 of each pair of contact leads 16 within body portion 10 is attached to a respective one of a pair of adjacent vertical contact plates 17 of electrically conductive material positioned below each receiving socket 8 in a parallel spaced relation to receive between them the base of an AG-1 flash lamp 13. The vertical pairs of contact plates 17 are spaced to resiliently engage the AG-1 lamp bases in position until the lamps are ejected, and as is known, the lead-in wires of an AG-1 lamp are formed into stirrups which are positioned on opposite sides of the lamp base, such that each contact plate 17 is in electrical engagement with a respective one lead-in wire.

At the upper portion of the flash adaptor is a fixed, spider-shaped wall 18 retaining the top edges of the reflectors 11. Centrally mounted above wall 18 is an accessible ejector knob 20 fixed to the top of a vertically slidable ejector control member or shaft 21 which passes through an opening in the center of retainer wall 18 to the interior of the adaptor between reflectors 11. Shaft 21 includes a stepped portion 22 of increased diameter at its lower portion, and a helical compression spring 23 is positioned between the stepped portion 22 and wall 18 to urge shaft 21 downwardly to the position shown in solid lines in FIG. 3. The center opening of wall 18 and a central opening in cover plate 9 form bearing guides for vertical movement only of the shaft 21.

Fixed to the lower end of shaft 21 are four ejector arms 24, each of which extends radially outwardly. The outer end of each arm 24 is positioned between the pair of contact plates 17 and engageable with the base of the inserted AG-1 lamp. Ejection of inserted lamps is accomplished by grasping knob 20 and pulling the knob upwardly against the bias of spring 23 to the position shown in dashed lines in FIG. 3. During this motion, the outer ends of ejector arms 24 simultaneously engage the bases of the four inserted lamps 13 to push the lamps 13 out of the respective sockets 9.

Use of a flash adaptor according to my invention may be accomplished by individually inserting four AG-1 lamps 13 into the sockets 9 until the bases of the lamps 13 are engaged by the respective pairs of resilient contact plates 17 to position each lamp 13 in front of a reflector 11. The device is then attached to a camera connecting socket by inserting connecting post 14 of the connecting base 12 into the connecting socket with the pair of electrical contact leads 16 of one of the lamps 13 engaging the fixed electrical terminals in the camera to place the one lamp 13 in the photoflash circuit. The leads 16 extend the circuit to the lamp 13, and the lamp is then fired in timed relation with camera operation by closing a shutter synchronizing switch in the circuit. After the one lamp 13 is fired, the adaptor may then be manually or automatically rotated to sequentially place the remaining lamps 13 in the photoflash circuit for firing with sequential operations of the camera. When all of the lamps 13 have been fired, the used lamps 13 may be simultaneously ejected by pulling accessible knob 20 upwardly. Spring 23 then returns the ejector arms 21 back to their original positions, and new lamps 13 can be inserted into the four sockets 9 for further flash exposures.

While my invention has been described in connection with a preferred embodiment as shown, it is obvious that certain modifications can be made without departing from the spirit of my invention or the scope of the subjoined claims.

I claim:

A multilamp photoflash adaptor comprising:
(a) a body portion;
(b) an attaching base to connect the adaptor to a connecting socket having electrical terminals of a photoflash circuit;
(c) a plurality of individual reflectors around the periphery of the body portion;
(d) socket means in the body portion to receive a flash lamp adjacent to each of the reflectors;
(e) electrical contacts to connect electrically the inserted lamps to the electrical terminals; and
(f) ejecting means to eject simultaneously all inserted lamps from the receiving socket means, the ejecting means including an axially movable ejector shaft positioned intermediate the reflectors, ejector arms extending radially from the shaft to the receiving socket means adjacent to the inserted lamps, and means for axially moving the shaft and arms to eject the inserted lamps from the receiving socket means.

References Cited

UNITED STATES PATENTS

| | | | |
|---|---|---|---|
| 2,892,073 | 6/1959 | Michatek et al. | 240—1.3 |
| 3,096,025 | 7/1963 | Prochnow | 240—1.3 |
| 3,244,087 | 4/1966 | Anderson et al. | 95—11 |

NORTON ANSHER, *Primary Examiner.*

F. L. BRAUN, *Assistant Examiner.*